United States Patent
Höglund et al.

(10) Patent No.: US 10,440,522 B2
(45) Date of Patent: Oct. 8, 2019

(54) RADIO NETWORK NODE, A WIRELESS DEVICE AND METHODS THEREIN

(71) Applicant: Telefonaktiebolaget LM Ericsson (publ), Stockholm (SE)

(72) Inventors: Andreas Höglund, Solna (SE); Oscar Ohlsson, Stockholm (SE); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/751,926

(22) PCT Filed: Sep. 23, 2016

(86) PCT No.: PCT/SE2016/050898
§ 371 (c)(1),
(2) Date: Feb. 12, 2018

(87) PCT Pub. No.: WO2017/052459
PCT Pub. Date: Mar. 30, 2017

(65) Prior Publication Data
US 2018/0242114 A1    Aug. 23, 2018

Related U.S. Application Data

(60) Provisional application No. 62/232,524, filed on Sep. 25, 2015.

(51) Int. Cl.
H04W 4/06 (2009.01)
H04W 4/70 (2018.01)
(Continued)

(52) U.S. Cl.
CPC .............. *H04W 4/06* (2013.01); *H04L 1/1614* (2013.01); *H04W 4/70* (2018.02); *H04W 48/12* (2013.01)

(58) Field of Classification Search
CPC ......... H04W 4/06; H04W 4/70; H04W 48/12; H04L 1/1614
(Continued)

(56) References Cited

U.S. PATENT DOCUMENTS

2009/0262693 A1* 10/2009 Wang ..................... H04W 48/12
                                                                370/329
2011/0013554 A1*  1/2011 Koskinen .............. H04L 5/0094
                                                                370/315
(Continued)

OTHER PUBLICATIONS

Unknown, "3GPP TS 36.211 V12.7.0 (Sep. 2015)", 3rd Generation Partnership Project; Technical Specification Group Radio Access Network; Evolved Universal Terrestrial Radio Access (E-UTRA); Physical channels and modulation (Release 12), Sep. 2015, 1-29.
(Continued)

*Primary Examiner* — Sai Ming Chan
(74) *Attorney, Agent, or Firm* — Murphy, Bilak & Homiller, PLLC (57) ABSTRACT

A Radio Network Node (RNN) 106 and a method therein for indicating scheduling of System Information (SI) messages in a wireless communications network 100. The RNN and a wireless device 108 are operating in the wireless communications network. The RNN provides, to the wireless device, a bitmap configuration in a System Information Block (SIB), wherein the bitmap configuration comprises a bitmap and one or more index bits. The bitmap is configured to indicate to the wireless device one or more subframes within one or more radio frames, which one or more subframes are available for transmission of an SI message. Further, the one or more index bits are configured to indicate the one or more radio frames within which the bitmap is to be applied.

20 Claims, 7 Drawing Sheets

(51) Int. Cl.
    *H04W 48/12*    (2009.01)
    *H04L 1/16*    (2006.01)
(58) Field of Classification Search
    USPC .......................................... 370/329
    See application file for complete search history.

(56) References Cited

U.S. PATENT DOCUMENTS

2011/0305287 A1* 12/2011 Kwon .................... H04L 5/0035
                                                    375/260
2015/0257173 A1*  9/2015 You ....................... H04L 1/1864
                                                    370/330

OTHER PUBLICATIONS

Unknown, "SIB for Rel-13 low complexity and coverage enhanced UEs", 3GPP TSG-RAN WG2 #91, R2-153711, Beijing, P.R. China, Aug. 24-28, 2015, 1-6.

* cited by examiner

Fig. 1

Fig. 2 Method performed by the RNN 206

Fig. 3

Fig. 4 Method performed by the wireless device 108

RADIO NETWORK NODE, A WIRELESS DEVICE AND METHODS THEREIN

TECHNICAL FIELD

Embodiments herein relate generally to a radio network node, a wireless device, and to methods therein. In particular they relate to indicating of scheduling of System Information (SI) messages in a wireless communications network.

BACKGROUND

Wireless devices such as terminals are also known as e.g. User Equipments (UEs), mobile terminals, stations (STAs), wireless terminals, communication devices and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB, micro eNodeB or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Machine Type Communication (MTC) is about providing connectivity for devices, e.g. MTC devices such as wireless devices, which communicate without human interaction. It is predicted to increase the number of connections exponentially more than the increase of human subscriptions and the number of fixed connections. This is sometimes referred to as 'the networked society'. Because of the different nature, the requirements for MTC are also different from those of human oriented smart phone traffic. For example, MTC devices need to have low cost, which is achieved by low UE complexity and reduced capabilities, e.g. one receiving antenna, a narrow device bandwidth that is smaller than the system bandwidth, etc. The power consumption should further be low in order to prolong battery life such that interactive battery charging is not required. By interactive battery charging is meant battery charging requiring human interaction to for example connect a cord to a power supply. Preferably, the battery should last, without requiring recharging, throughout the life span of the device. To be able to reach devices in challenging location, such as basements, it is desirable to enhance coverage in comparison to normal systems.

In 3GPP, Rel-13 MTC, work is ongoing to support coverage enhancements of up to 15 dB. This is achieved by time repetition in a Transmission Time Interval (TTI) bundling manner, similar to that introduced for Voice over IP (VoIP) in Rel-8. In Rel-8, TTI bundling is limited to the uplink shared data channel and fixed to 4 repetitions. For Rel-13 MTC devices requiring coverage enhancements, the number of repetitions may be configured per coverage area, e.g. cell, or per wireless device, e.g. UE. Link simulations show that the number of required repetitions may be over 100 to achieve the targeted 15 dB gain for some channels.

In Rel-12 a lower complexity UE category 0 (Cat-0) was introduced to support lower manufacturing costs for MTC devices. In Rel-13 further complexity reductions are being introduced where the largest change is a reduced device bandwidth from e.g. 100 to 6 Physical Resource Blocks (PRBs) or from 20 MHz to 1.4 MHz. This means that some legacy channels like the Physical Downlink Control CHannel (PDCCH), which spans over the entire system bandwidth, cannot be received. The working assumption for these low complexity UEs is to replace PDCCH with an updated version of Enhanced Physical Downlink Control CHannel (E-PDCCH) transmitted only within 6 PRBs (referred to as MTC PDCCH (M-PDCCH). The lower complexity of the devices means that a small number of repetitions might be needed also for these devices in normal coverage. That is, the repetitions are needed to counteract the losses from using only one receiving antenna (Rel-12), loss of frequency diversity (Rel-13), etc. Further, due to the extended transmission time resulting from the repetitions, the working assumption is to have cross-subframe scheduling. That is, a transmission is first scheduled by repetitions on E-PDCCH and then the repetitions of the actual data transmission are carried out first after the final transmission of the E-PDCCH.

The document "SIB for Rel-13 low complexity and coverage enhanced UEs" (3GPP draft; R2-153711, Mobile Competence Centre; 650 Route des Lucioles; F-06921 Sophia-Antipolis, vol. RAN WG2, no. Beijing, P.R. China; 20150824-30150828 23 Aug. 2015 (2015 Aug. 23)) discusses system information design for Rel-13 low-complexity and coverage enhanced UEs (Rel-13 LC/CE UEs), focusing on SIB1x/SI scheduling. It is disclosed that the SIB1x contains detailed scheduling information such as time, frequency, and Modulation and Coding Scheme (MCS)/Transport Block Size (TBS), by means of which subsequent SIBs can be acquired without reading PDCCH.

US 2009/0262693 A1 discloses a method and an apparatus for allocating sub-frames in a system information transmission window, allocating transmission sub-frames consecutively at the beginning of the system information transmission window, allocating non-transmission subframes at end of the system information transmission window, and transmitting the system information transmission window.

SUMMARY

An object of embodiments herein is to address at least some of the drawbacks with the prior art and to improve the performance in a wireless communications network.

According to one aspect of embodiments herein, the object is achieved by a method performed by a Radio Network Node (RNN) for indicating scheduling of System Information (SI) messages in a wireless communications network. The RNN and a wireless device are configured to operate in the wireless communications network.

The RNN provides, to the wireless device, a bitmap configuration in a System Information Block (SIB). The bitmap configuration comprises a bitmap and one or more index bits.

Further, the bitmap is configured to indicate to the wireless device one or more subframes within one or more radio frames, which one or more subframes are available for transmission of an SI message.

Furthermore, the one or more index bits are configured to indicate the one or more radio frames within which the bitmap is to be applied.

According to another aspect of embodiments herein, the object is achieved by a Radio Network Node (RNN) for indicating scheduling of System Information (SI) messages in a wireless communications network. The RNN and a wireless device are configured to operate in the wireless communications network.

The RNN is configured to provide, to the wireless device, a bitmap configuration in a System Information Block (SIB). The bitmap configuration comprises a bitmap and one or more index bits.

Further, the bitmap is configured to indicate to the wireless device one or more subframes within one or more radio frames, which one or more subframes are available for transmission of an SI message.

Furthermore, the one or more index bits are configured to indicate the one or more radio frames within which the bitmap is to be applied.

According to another aspect of embodiments herein, the object is achieved by a method performed by a wireless device for receiving an indication of scheduling of System Information (SI) messages in a wireless communications network. The wireless device and a Radio Network Node (RNN) are operating in the wireless communications network.

The wireless device obtains, from the RNN, a bitmap configuration in a System Information Block (SIB). The bitmap configuration comprises a bitmap and one or more index bits.

Further, the bitmap is configured to indicate to the wireless device one or more subframes within one or more radio frames, which one or more subframes are available for transmission of an SI message.

Furthermore, the one or more index bits are configured to indicate the one or more radio frames within which the bitmap is to be applied.

According to another aspect of embodiments herein, the object is achieved by a wireless device for receiving an indication of scheduling of System Information (SI) messages in a wireless communications network. The wireless device and a Radio Network Node (RNN) are configured to operate in the wireless communications network.

The wireless device is configured to obtain, from the RNN, a bitmap configuration in a System Information Block (SIB). The bitmap configuration comprises a bitmap and one or more index bits.

Further, the bitmap is configured to indicate to the wireless device one or more subframes within one or more radio frames, which one or more subframes are available for transmission of an SI message.

Furthermore, the one or more index bits are configured to indicate the one or more radio frames within which the bitmap is to be applied.

Since the RNN provides, to the wireless device, the bitmap configuration in the SIB, which bitmap configuration comprises a bitmap and one or more index bits, since the bitmap is configured to indicate to the wireless device one or more subframes within one or more radio frames, which one or more subframes are available for transmission of an SI message, and since the one or more index bits are configured to indicate the one or more radio frames within which the bitmap is to be applied, the signalling bits for scheduling of the SI message will be kept to a minimum or at least will be reduced as compared to prior art scheduling. By reducing or minimizing the signalling bits, the system overhead for broadcasting the signalling bits will be reduced or minimized. That results in an improved performance in the wireless communications network.

An advantage of some embodiments herein is that scheduling of SI messages may be done with full flexibility and control from the network, e.g. the radio network node. If an indication to a pre-configured setting is used, the number of signalling bits may be reduced in comparison to indicating all available downlink subframes. If however, a bitmap indicating all available downlink subframes is used, the additional indication of the SI message repetitions will only introduce a minimal overhead.

Another advantage of some embodiments herein is that the reduced or minimized signaling bits is always or almost always applied as opposed to legacy networks using dynamic scheduling wherein the amount of signaling bits must be indicated each time.

BRIEF DESCRIPTION OF DRAWINGS

Examples of embodiments herein are described in more detail with reference to attached drawings in which.

DETAILED DESCRIPTION

In legacy Evolved Universal Terrestrial Radio Access Networks (E-UTRAN), system information is broadcasted by a Radio Network Node (RNN), e.g. an eNB, as one or more SI messages. These one or more SI messages have a certain periodicity and are scheduled within an SI window by means of the PDCCH. Both the periodicity and the scheduling of the SI messages within the SI window is indicated in a first System Information Block (SIB) referred to as SIB1. The information in the SIB1 assists the UE when it is evaluating cell access and also defines the scheduling of other system information. One or more second SIBs may exists. For example, the one or more second SIBs may comprise SIB2-SIB19.

For Rel-13, the PDCCH is not supported and therefore the full scheduling information must be included in the Rel-13 narrowband version of SIB1, which is called SIB1bis. That is, for Rel-13, a frequency-position, a time-position, a Transport Block Size (TBS), etc. must be added to the schedulingInfoList in SIB1bis. The frequency-position, the time position and the TBS is sometimes referred to as Downlink Control Information (DCI). In prior art, the DCI is transmitted on the PDCCH.

With PDCCH-scheduling in the legacy case, the subframe could be dynamically indicated by the network, e.g. by means of the RNN, but in Rel-13 it must instead be indicated in the SIB1bis which downlink subframes will be used for the SI message transmission. Note that there will typically be several subframes within the SI window since repetitions will be needed both for Rel-13 coverage enhancements and for Rel-13 low complexity UEs in normal coverage. Moreover the size of SIB1bis should be kept to a minimum in order to both maintain a low overhead from system information broadcast since SIB1bis is transmitted frequently, and to obtain a low UE power consumption since SIB1bis will typically be read when UEs return from deep sleep, e.g. from a Power Saving Mode (PSM) or an enhanced Discontinuous Reception (eDRX), and need to check the one or more Information Element (IE) that are frequently updated, e.g. a valueTag.

Some embodiments herein provide network flexibility when including scheduling for MTC SI messages in an initial scheduling SIB, e.g. SIB1bis. Especially, some embodiments herein relate to full network flexibility for MTC SI message scheduling, e.g. for MTC Rel-13 SI message scheduling.

Thus, some embodiments herein provides for network flexibility, e.g. full network flexibility, when including scheduling for MTC SI messages in the initial scheduling SIB, e.g. when including scheduling for Rel-13 LC/CE MTC SI messages in the SIB1bis. Further, by embodiments herein, different methods of flexible subframe indication for MTC SI message scheduling is provided.

Figure 1:
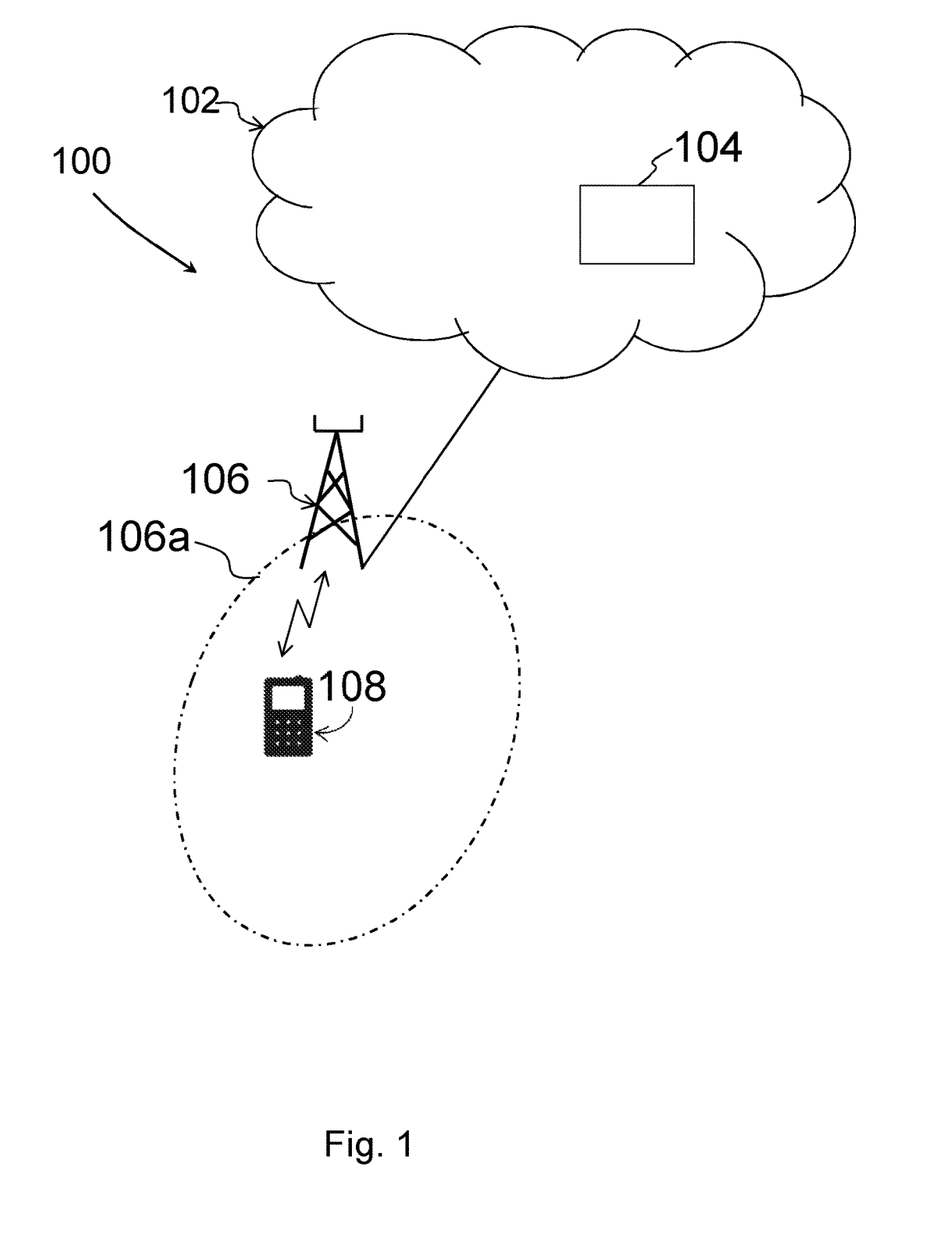
FIG. 1 schematically illustrates embodiments of a communications network.

As schematically illustrated in FIG. 1, embodiments herein relate to a wireless communications network 100. The wireless communications network 100 may be an Universal Mobile Telecommunications System (UMTS) network, a Long-Term Evolution (LTE) network, a Wideband Code Division Multiple Access (WCDMA) network, a Global System for Mobile Communications (GSM) network, any 3GPP cellular network, a Worldwide Interoperability for Microwave Access (Wimax) network, or any other wireless communication network or system configured to support MTC.

The wireless communications network 100 comprises a core network 102. The core network 102 may be an UMTS core network, a LTE core network, a WCDMA core network, an GSM core network, any 3GPP cellular core network, a Wimax core network, or a core network of any other wireless communication network or system configured to support MTC.

A network node 104 may be comprised in or arranged in communication with the core network 102. The network node 104 may be a Radio Network Controller (RNC) operating in an UMTS network. In some embodiments, the network node 104 is a Base Station Controller (BSC), a Mobile Switching Center (MSC), a media Gateway (MGw), a Serving GPRS Support Node (SGSN) or a Mobility Management Entity (MME). Further, in some embodiments, the network node 104 is a base station.

A Radio Network Node (RNN) 106 is arranged and configured to operate in the wireless communication network 100. The RNN 106 is configured for wireless communication with wireless devices, such as a wireless device 108, when they are located within a geographical area 106a served by the RNN 106. The geographical area 106a is sometimes referred to as a cell, a coverage area, or a cluster.

The RNN 106 may be a transmission point such as a radio base station, for example an eNB, an eNodeB, or an Home Node B, an Home eNode B or any other network node capable to serve a user equipment or a machine type communication device in a wireless communications network, such as the wireless communications network 100. The RNN 106 may further be configured to communicate with the network node 104.

The wireless device 108, herein also referred to as an MTC device, a user equipment or UE, operates in the wireless communications network 100. The wireless device 108 may also be referred to as a wireless communications device. The wireless device 108 may e.g. be a user equipment, a mobile terminal or a wireless terminal, a mobile phone, a computer such as e.g. a laptop, a Personal Digital Assistant (PDA) or a tablet computer, sometimes referred to as a tablet, with wireless capability, or any other radio network units capable to communicate over a radio link in the wireless communications network 100. Please note the term user equipment used in this document also covers other wireless devices such as Machine to Machine (M2M) devices, even though they do not have any user.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

An example of a method performed by the RNN 106 for indicating scheduling of System Information (SI) messages in the wireless communications network 100, will now be described with reference to the flowchart depicted in FIG. 2. The RNN 106 and the wireless device 108 are operating in the wireless communications network 100.

Figure 2:
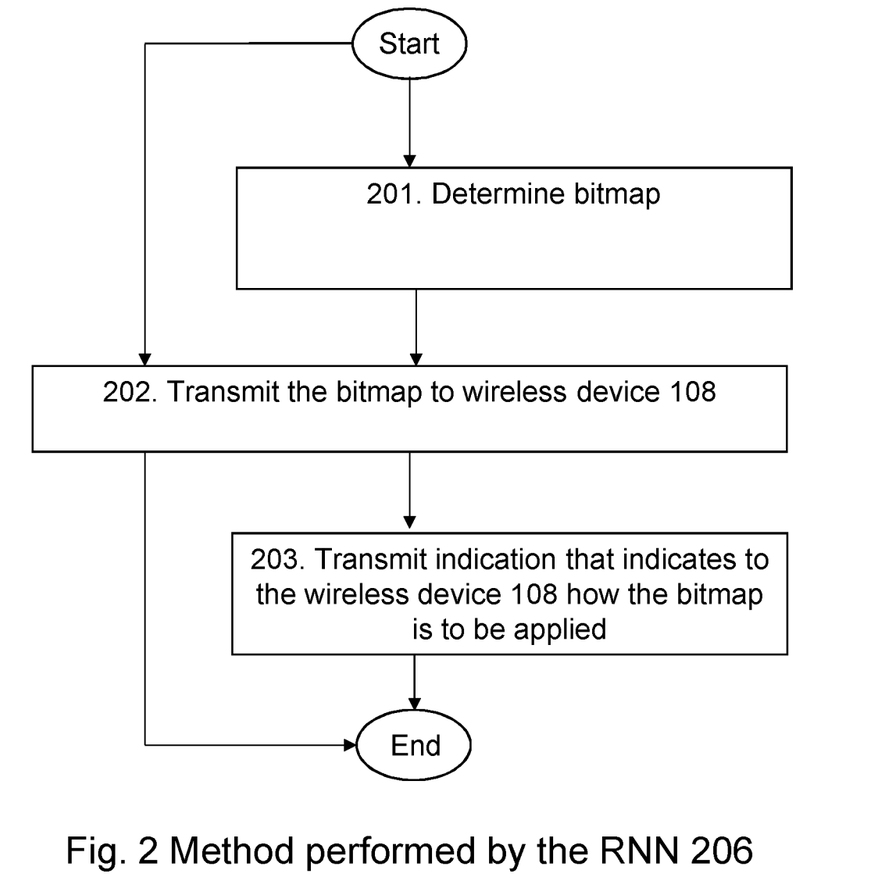
FIG. 2 is a flowchart schematically illustrating embodiments of a method performed by a Radio Network Node (RNN)

For example, FIG. 2 schematically illustrates embodiments of a method performed by the RNN 106 for flexible subframe indication for scheduling of System Information (SI) messages in one or more SI Blocks (SIB). One or more of the Actions below may be combined and/or performed in another suitable order. Further, one or more actions may be optional.

Action 201

In some embodiments, the RNN 106 determines a bitmap configuration based on a consideration of subframes in use for Multicast-Broadcast Single-Frequency Network (MB-SFN) broadcast; unicast data transmissions; Physical Broadcast Channel (PBCH); or legacy SIB1 broadcast, and based on one or more subframes available for transmission of the SI message. For example, this may be performed by _the RNN 106, e.g. the eNB. That is, the RNN 106 subtracts the subframes in use for the above listed causes and broadcasts the remaining set to UEs, e.g. the wireless device 108, in system information.

Thus in Action 201, the RNN 106, may determine a bitmap. As previously described, the bitmap may indicate to the wireless device 108 how the repetitions of the SI message are spread within a radio frame. Alternatively, or in addition, the bitmap may comprise an indication of one or more available subframes, e.g. one or more available downlink subframes, of one or more radio frame. The one or more available downlink subframes may sometimes be referred to as one or more valid downlink subframes, one or more Bandwidth Limited (BL) subframes or one or more Coverage Enhancement (CE) subframes.

As mentioned above, the RNN 106 may determine the bitmap by considering the subframes in use for e.g. MBSFN-broadcast, unicast data transmissions, Physical Broadcast Channel (PBCH), legacy SIB1 broadcast, etc.

Action 202

In order to inform the wireless device 108 about the bitmap configuration, the RNN 106 provides, to the wireless device 108, the bitmap configuration in a System Information Block (SIB). The bitmap configuration comprises a bitmap and one or more index bits.

Further, the bitmap may be configured to indicate to the wireless device 108 one or more subframes within one or more radio frames, which one or more subframes are available for transmission of an SI message. Thereby, the wireless device 108 will know in which one or more subframes the RNN 106 may transmit the SI message.

Furthermore, the one or more index bits may be configured to indicate the one or more radio frames within which the bitmap is to be applied. In some embodiments, the index bits are given by a radio frame index k, and wherein the one or more radio frames within which the bitmap is to be applied is given by: System Frame Number, SFN, mod(k) =0.

The RNN 106 may provide the bitmap configuration to the wireless device 108 by transmitting the bitmap configuration in an initial scheduling SIB to the wireless device 108. As previously mentioned, the terms "initial scheduling SIB", "first SIB (SIB1)", and "SIB1bis" are used interchangeably in this disclosure.

In some embodiments, the RNN 106 may provide the bitmap configuration to the wireless device 108 by transmitting, to the wireless device 108, a configuration index in an initial scheduling SIB. The configuration index may be configured to indicate the bitmap configuration to the wireless device 108.

Thus, in Action 202, the RNN 106 transmits the bitmap to the wireless device 108. For example, the bitmap may be comprised in a System information Block (SIB), e.g. in a first SIB (SIB1) such as a narrowband SIB1 sometimes referred to as SIB1bis, transmitted to the wireless device 108.

Action 203

As previously mentioned, the RNN 106 may transmit, to the wireless device 108, the bitmap configuration in an initial scheduling SIB. This may be seen as the RNN 106 indicates, to the wireless device 108, how the bitmap is to be applied.

Thus, in Action 203, and in some embodiments, the RNN 106 indicates, to the wireless device 108, how the bitmap is to be applied. For example, the RNN 106 may transmit an indication to the wireless device 108, which indication is configured to indicate to the wireless device 108 how the bit map is to be applied.

In some embodiments, the RNN 106 transmits one or more bits, e.g. index bits or radio frame bits, which bits indicate to the wireless device 108 in which radio frames the repetition pattern is to be used.

Further, the RNN 106 may transmit, to the wireless device 108, one or more bits, e.g. repetition bits, which indicates the number of repetitions of the SI message.

The one or more indications may be transmitted in the SIB, e.g. in the SIB1bis, and may comprise one or more bits.

In some embodiments, the RNN is configured to indicate, to the wireless device, one or more subframes of the radio frame that is not used for repeating the SI message. This may for example be the case when one or more of the subframes are used for Multicast-Broadcast Single-Frequency Network (MBSFN) broadcast.

Figure 3:
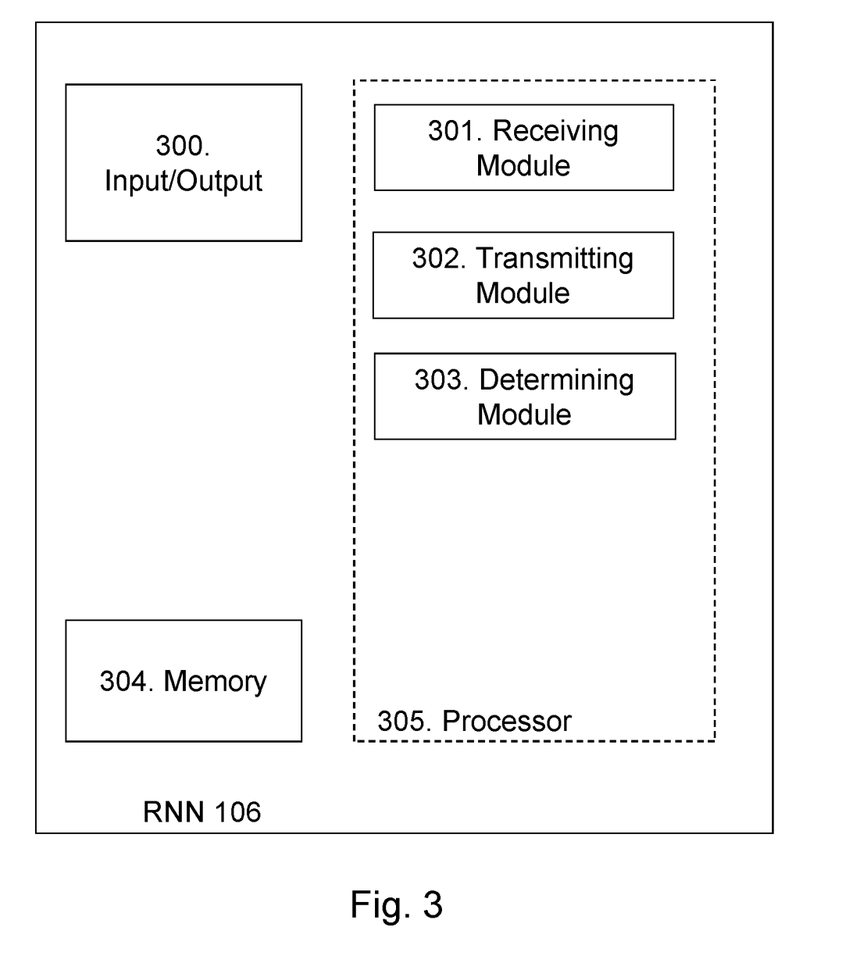
FIG. 3 is a block diagram schematically illustrating embodiments of an RNN.

To perform the method for indicating scheduling of System Information (SI) messages in the wireless communications network 100, the RNN 106 may be configured according to an arrangement depicted in FIG. 3. As previously mentioned, RNN 106 and the wireless device 108 are operating in the wireless communications network 100.

As schematically illustrated in FIG. 3, the embodiments herein may be implemented through one or more processors, such as a processor 305 in the RNN 106, together with computer program code for performing the functions and actions of the embodiments herein. The program code may be implemented in one or several network nodes both in the cellular network and/or in a non-cellular network and/or in the wireless device. The program code mentioned above may also be provided as a computer program product, for instance in the form of a data carrier carrying computer program code for performing the embodiments herein when being loaded into network node, e.g. the RNN 206. One such carrier may be in the form of a CD ROM disc. It is however feasible with other data carriers such as a memory stick. The computer program code may furthermore be provided as pure program code on a server and downloaded to the network node, e.g. the RNN 106.

The RNN 1206 may further comprise a memory 304 comprising one or more memory units. The memory is arranged to be used to store obtained information, store data, configurations, schedulings, and applications etc. to perform the methods herein when being executed in the RNN 106.

The RNN 106 may further comprise means 300, 301, 302, 303 configured to e.g. transmit information, receive information, determine bitmap, indices, subframes, mapping of SI message to subframe, MBSFN broadcast configurations, etc. Such means may be realised by an input/output interface 300, a receiving module 301, a transmitting module 302, a determining module 303, etc. adapted to transmit, receive, determine, configure, decide etc. as described herein.

The RNN 106 comprises an input and output interface 300 configured to communicate, with one or more network nodes, e.g. with a wireless device such as the wireless device 108, or another RNN, operating in the wireless communications network 100. The input and output interface 300 may comprise a wireless receiver (not shown) and a wireless transmitter (not shown).

The RNN 106 is configured to receive, e.g. by means of a receiving module 301 configured to receive, a transmission from one or more network nodes, e.g. from a wireless device such as the wireless device 108, or another RNN. The receiving module 301 may be implemented by or arranged in communication with the processor 305 of the RNN 106.

The RNN 106 is configured to transmit, e.g. by means of a transmitting module 302 configured to transmit, a transmission to one or more network nodes, e.g. to a wireless device such as the wireless device 108, or another RNN. The transmitting module 302 may be implemented by or arranged in communication with the processor 305 of the RNN 106.

The RNN 106 is configured to provide, to the wireless device 108, a bitmap configuration in a SIB. The bitmap configuration comprises a bitmap and one or more index bit.

Further, the bitmap is configured to indicate to the wireless device 108 one or more subframes within one or more radio frames, which one or more subframes are available for transmission of an SI message.

Furthermore, the one or more index bits are configured to indicate the one or more radio frames within which the bitmap is to be applied. The index bits may be given by a radio frame index k, and wherein the one or more radio frames within which the bitmap is to be applied is given by System Frame Number (SFN) mod(k)=0.

In some embodiments, the RNN 206 is configured to provide the bitmap configuration by being configured to transmit, to the wireless device 108, the bitmap configuration in an initial scheduling SIB.

The RNN 106 may be configured to provide the bitmap configuration by being configured to transmit, to the wireless device 108, a configuration index in an initial scheduling SIB, and wherein the configuration index is configured to indicate the bitmap configuration to the wireless device 108.

The RNN 106 is configured to determine, e.g. by means of a determining module 303 configured to determine, the bitmap configuration. The determining module 303 may be implemented by or arranged in communication with the processor 305 of the RNN 106.

The RNN 106 may be configured to determine the bitmap configuration based on a consideration of subframes in use for MBSFN broadcast; unicast data transmissions; PBCH; or legacy SIB1 broadcast, and based on one or more subframes available for transmission of the SI message.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processors in the RNN 206 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

An example of a method performed by the wireless device 108 for receiving scheduling of SI messages in the wireless communications network 100, will now be described with reference to the flowchart depicted in FIG. 4. As previously mentioned, the RNN 106 and the wireless device 108 are operating in the wireless communications network 100.

Figure 4:
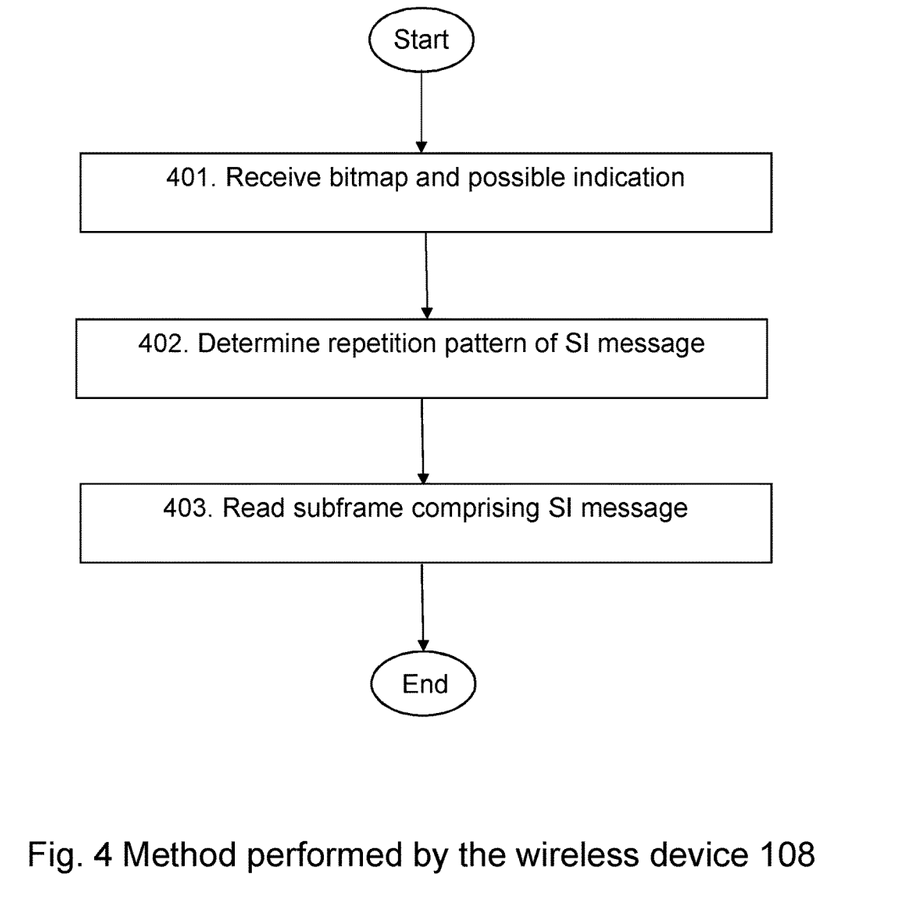
FIG. 4 is a flowchart schematically illustrating embodiments of a method performed by a wireless device.

For example, FIG. 4 schematically illustrates a method performed by the wireless device 108. One or more of the Actions below may be combined and/or performed in another suitable order. Further, one or more actions may be optional.

Action 401

The wireless device 108 obtains, from the RNN 106, a bitmap configuration in a SIB. The bitmap configuration comprises a bitmap and one or more index bits.

The bitmap is configured to indicate to the wireless device 108 one or more subframes within one or more radio frames, which one or more subframes are available for transmission of an SI message.

Further, the one or more index bits are configured to indicate the one or more radio frames within which the bitmap is to be applied. In some embodiments, the index bits are given by a radio frame index k, and the one or more radio frames within which the bitmap is to be applied is given by SFN mod(k)=0.

In some embodiments, the wireless device 108 obtains the bitmap configuration by receiving, from the RNN 106, the bitmap configuration in an initial scheduling SIB.

The wireless device 108 may obtain the bitmap configuration by receiving, from the RNN 106, a configuration index in an initial scheduling SIB. The configuration index may be configured to indicate the bitmap configuration to the wireless device 108.

Thus, in Action 401, the wireless device 108 receives, from the RNN 106, the bitmap. The wireless device 108 may receive the bitmap in an SIB, e.g. an SIB1 or an SIB1bis, received from the RNN.

In some embodiments, the wireless device 108 further receives from the RNN 106, an indication, e.g. a first indication. The first indication may be received in the SIB, e.g. the SIB1bis.

As previously mentioned, the wireless device 108 may receive one or more bits from the RNN 106, which bits may be accompanying the bitmap.

As previously mentioned, the first indication may indicate, to the wireless device 108, how the bitmap is to be applied.

In some embodiments, the first indication comprises one or more bits, e.g. index bits or radio frame bits, which bits indicate to the wireless device 108 in which radio frames the repetition pattern is to be used.

Further, the first indication may comprise one or more bits, e.g. repetition bits, which indicates the number of repetitions of the SI message.

In some embodiments, the wireless device 108, receives from the RNN 106, an indication, e.g. a second indication, of one or more subframes that is not to be used for repeating the SI message. The second indication may be received in the SIB, e.g. in the SIB1bis. This may for example be the case when one or more subframes are used for MBSFN broadcast.

Action 402

The wireless device 108 determines, based on the bitmap configuration, one or more subframes of one or more radio frames, which one or more subframes comprise the SI message.

Thus, in Action 402, the wireless device 108 may directly or indirectly determine the repetition pattern of the SI message. For example, and as previously described, by means of the bitmap and one or more accompanying bits, the wireless device 108 may determine one or more of: one or more radio frames comprising a repetition, one or more subframes comprising a repetition, and the number of times the SI message is repeated within one or more subframe.

Action 403

The wireless device 108 reads the SI message in the determined one or more subframes of the one or more radio frames.

Thus, in Action 403, the wireless device 108 reads the SI message in one or more of the determined subframes. When the wireless device 108 has received the second indication of one or more subframes that is not used for repeating the SI message, the wireless device 108 will not try to read those subframes.

Figure 5:
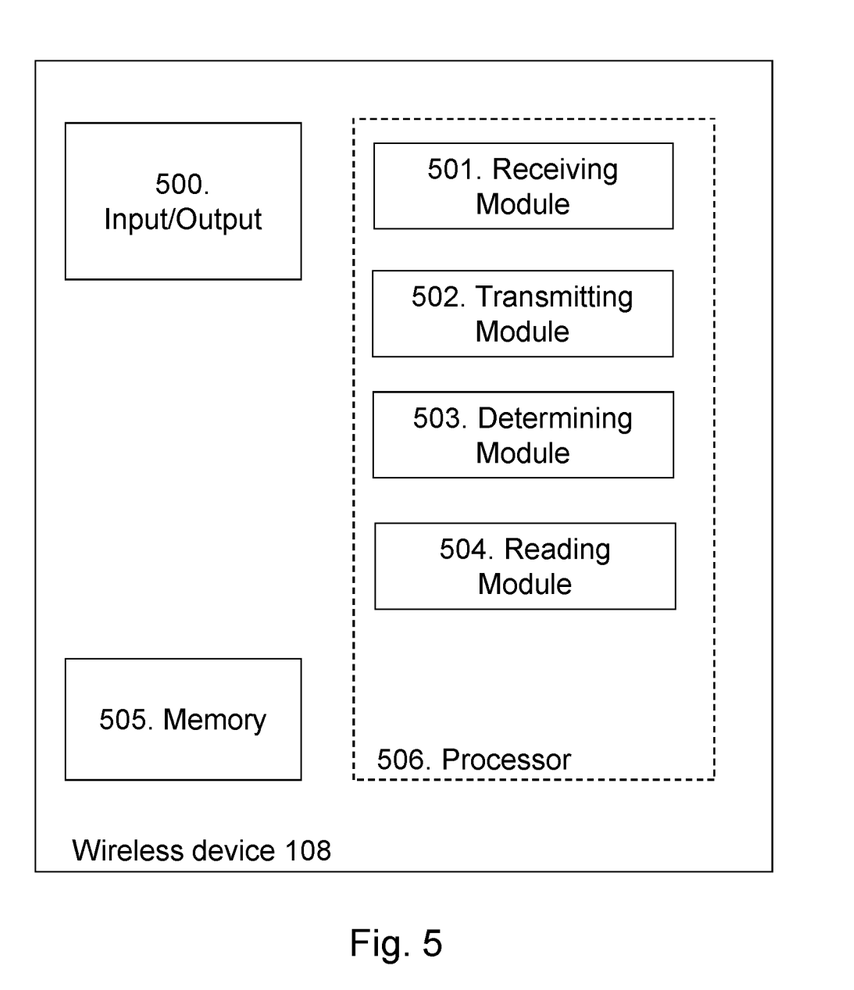
FIG. 5 is a block diagram schematically illustrating embodiments of a wireless device.

To perform the method for receiving an indication of scheduling of System Information (SI) messages in the wireless communications network 100, the wireless device 108 may be configured according to an arrangement depicted in FIG. 5. As previously mentioned, RNN 106 and the wireless device 108 are configured to operate in the wireless communications network 100.

As schematically illustrated in FIG. 5, the embodiments herein may be implemented through one or more processors, such as a processor 506 in the wireless device 108, together with computer program code for performing the functions and actions of the embodiments herein. The program code may be implemented in one or several network nodes both in the cellular network and/or in a non-cellular network and/or in the wireless device 108. The program code mentioned above may also be provided as a computer program product, for instance in the form of a data carrier carrying computer program code for performing the embodiments herein when being loaded into network node or communication device. One such carrier may be in the form of a CD ROM disc. It is however feasible with other data carriers such as a memory stick. The computer program code may furthermore be provided as pure program code on a server and downloaded to the network node or the communication device, e.g. the wireless device 108.

The wireless device 108 may further comprise a memory 505 comprising one or more memory units. The memory is arranged to be used to store obtained information, store data, configurations, schedulings, and applications etc. to perform the methods herein when being executed in the wireless device 108.

The wireless device 108 may further comprise means 500,501,502,503, 504, 505, 506 configured to e.g. transmit information, receive information, determine number of repetitions, radioframes, subframes, mapping of SI message to subframe, MBSFN broadcast configurations, read SI message etc. Such means may be realised by an input/output interface 500, a receiving module 501, a transmitting module 502, a determining module 504, a reading module 505, etc. adapted to transmit, receive, determine, read, configure, modify, decide etc. as described herein.

The wireless device 108 comprises an input and output interface 500 configured to communicate, with one or more network nodes, e.g. with another wireless device or a RNN such as the RNN 106, operating in the wireless communications network 100. The input and output interface 500 may comprise a wireless receiver (not shown) and a wireless transmitter (not shown).

The wireless device 108 is configured to receive, e.g. by means of a receiving module 501 configured to receive, a transmission from one or more network nodes, e.g. from another wireless device or a RNN such as the RNN 106. The receiving module 501 may be implemented by or arranged in communication with the processor 506 of the wireless device 108.

The wireless device 108 is configured to obtain, from the RNN 106, a bitmap configuration in a SIB. The bitmap configuration comprises a bitmap and one or more index bits.

Further, the bitmap is configured to indicate to the wireless device 108 one or more subframes within one or more radio frames, which one or more subframes are available for transmission of an SI message.

Furthermore, the one or more index bits are configured to indicate the one or more radio frames within which the bitmap is to be applied. In some embodiments, the index bits are given by a radio frame index k, and the one or more radio frames within which the bitmap is to be applied is given by SFN mod(k)=0.

In some embodiments, the wireless device 108 is configured to obtain the bitmap configuration by being configured to receive, from the RNN 106, the bitmap configuration in an initial scheduling SIB.

The wireless device 108 may be configured to obtain the bitmap configuration by being configured to receive, from the RNN 106, a configuration index in an initial scheduling SIB. The configuration index may be configured to indicate the bitmap configuration to the wireless device 108.

The wireless device 108 is configured to transmit, e.g. by means of a transmitting module 502 configured to transmit, a transmission to one or more network nodes, e.g. to another wireless device or a RNN such as the RNN 106. The transmitting module 502 may be implemented by or arranged in communication with the processor 506 of the wireless device 108.

The wireless device 108 is configured to determine, e.g. by means of a determining module 503 configured to determine, a bitmap configuration. The determining module 503 may be implemented by or arranged in communication with the processor 506 of the wireless device 108.

The wireless device 108 may be configured to determine, based on the bitmap configuration, one or more subframes of one or more radio frames, which one or more subframes comprise the SI message.

The wireless device 108 is configured to read, e.g. by means of a reading module 504 configured to read, one or more messages. The reading module 504 may be implemented by or arranged in communication with the processor 506 of the wireless device 108.

The wireless device 108 may be configured to read the SI message in the determined one or more subframes of the one or more radio frames.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processor in the wireless device 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

Some embodiments herein provide a bitmap of one or more subframes in a radio frame and combine this bit map with one or more further bits to indicate in which radio frame(s) a repetition pattern will be applied. Further, in order to reduce the number of bits required in the initial scheduling SIB, e.g. the SIB1bis, in order to be able to signal the configuration, a set of predefined mappings may be provided and only a few indication bits may be used to select between mappings comprised in the set. SIB1bis may sometimes also be referred to as a SystemInformationBlockType1-BR.

Some embodiments herein relate to a method in a Radio Network Node (RNN), e.g. the RNN 106.

The RNN may determine a bitmap. The bitmap may indicate, to a wireless device, e.g. the wireless device 108, a repetition pattern for one or more repetitions of an SI message.

The RNN transmits the bitmap to the wireless device. For example, the bitmap may be comprised in a System information Block (SIB) comprising scheduling information for SI messages, e.g. in a first SIB (SIB1) such as a narrowband SIB1 sometimes referred to as SIB1bis, transmitted to the wireless device. The expressions initial scheduling SIB, first SIB (SIB1), and SIB1bis are sometimes herein used interchangeably.

Further, the RNN indicates, to the wireless device, how the bitmap is to be applied. For example, the RNN may transmit an indication to the wireless device, which indication is configured to indicate to the wireless device how the bit map is to be applied.

In some embodiments, the RNN is configured to indicate, to the wireless device, one or more subframes not used for repeating the SI message carrying one or more second SIBs. This may for example be the case when one or more of the subframes are used for Multicast-Broadcast Single-Frequency Network (MBSFN) broadcast.

Further, some embodiments herein relate to a method in a wireless device, e.g. the wireless device 108. The wireless device receives, from the RNN, e.g. the RNN 106, the bitmap. The wireless device may receive the bitmap in an SIB, e.g. an SIB1 or an SIB1bis, received from the RNN.

In some embodiments, the wireless device further receives from the RNN, an indication. The indication may be received in the SIB, e.g. the SIB1bis.

As previously mentioned, the indication may indicate, to the wireless device, how the bitmap is to be applied.

In some embodiments, the indication comprises one or more bits, e.g. index bits or radio frame bits, which bits indicate to the wireless device in which radio frames the repetition pattern is to be used.

Further, the indication may comprise one or more bits, e.g. repetition bits, which indicates the number of repetitions of the SI message.

In some embodiments, the wireless device, receives from the RNN, an indication, e.g. a second indication, of one or more subframes that is not to be used for repeating the SI message comprising one or more second SIBs. The indication may be received in the SIB, e.g. the SIB1bis. This may for example be the case when one or more subframes are used for MBSFN broadcast.

Further, the wireless device may directly or indirectly determine the repetition pattern of the SI message. For example, and as previously described, by means of the bitmap and one or more accompanying bits, the wireless device may determine one or more of: one or more radio frames comprising a repetition, one or more subframes comprising a repetition, and the number of times the SI message is repeated within one or more subframe.

The wireless device reads the SI message in one or more of the determined subframes. When the wireless device has received the indication of one or more subframes not used for repeating the SI message comprising the one or more second SIBs, the wireless device will not try to read those subframes.

Furthermore, some embodiments herein relate to a RNN and a wireless device comprising means configured to perform one or more actions described herein.

Embodiments herein comprise one or more other modules configured to realise features and to perform actions described herein.

As previously mentioned, some embodiments herein provide a bitmap of one or more subframes in a radio frame and combine this bitmap with one or more further bits, sometimes in this disclosure referred to as one or more index bits or indication bits, to indicate in which radio frame(s) a repetition pattern will be applied. Further, in order to reduce the number of bits required in the SIB, e.g. the SIB1bis, in order to be able to signal the configuration, a set of predefined mappings may be provided and only a few index bits may be used to select between mappings comprised in the set.

Sometimes in this disclosure, the index bits are referred to as Radio Frame (RF) bits. For example, RF bits may indicate that a repetition pattern may be applied every RF, every second RF, every fourth RF etc., just to give some examples.

The bitmap may be determined by a network node, such as a radio network node, and it may be transmitted by the network node to a wireless device.

In some embodiments, the bitmap indicates to the wireless device how the repetitions of the SI message are spread within a radio frame. In other words, the bitmap indicates to the wireless device the subframes, comprised in the radio frame, that comprise a repetition of the SI message.

In some embodiments relating to a radio frame comprising ten subframes the bitmap is a ten digit bitmap. However, it should be understood that the bitmap may be another suitable bitmap, as long as the number of digits comprised in the bitmap corresponds or relates to the number of subframes comprised in the radio frame.

The bitmap may be accompanied by a number of bits, herein sometimes referred to as indication bits or index bits, which are used to indicate in which radio frames the repetitions of an SI message are transmitted. The number of bits and/or which bits to transmit to the wireless device is determined by the network node, e.g. the radio network node.

This is relevant since it may be desirable to maintain a low system overhead for broadcast of the SI message, or to spread the repetitions of the SI message over several radio frames in order to achieve time diversity gains. According to some embodiments herein, this may be done according to the following example.

For example, two (2) bits, e.g. two index bits, may be used to indicate the subset of radio frames in which the repetitions of the SI message are sent. Further, the repetitions of the SI message may be sent only in the subframes indicated by the bitmap in the radio frames for which a System Frame Number (SFN) mod(k)=0, wherein k={1,2,3,4}. In other words, the repetitions of the SI message may be sent only in the subframes indicated by the bitmap in the radio frames for which the radio frame number when divided by a predetermined integer k gives a zero remainder.

TABLE 1

| Index bits: | k: |
|---|---|
| 00 | 1 |
| 01 | 2 |
| 10 | 3 |
| 11 | 4 |

In this example, and as illustrated in table 1 above, the repetitions of the SI message may be transmitted in every radio frame (k=1), every second radio frame (k=2), every third radio frame (k=3) or every fourth radio frame (k=4). Further, the table 1 above shows the index bits used to indicate the respective number of repetitions.

Figure 6A:
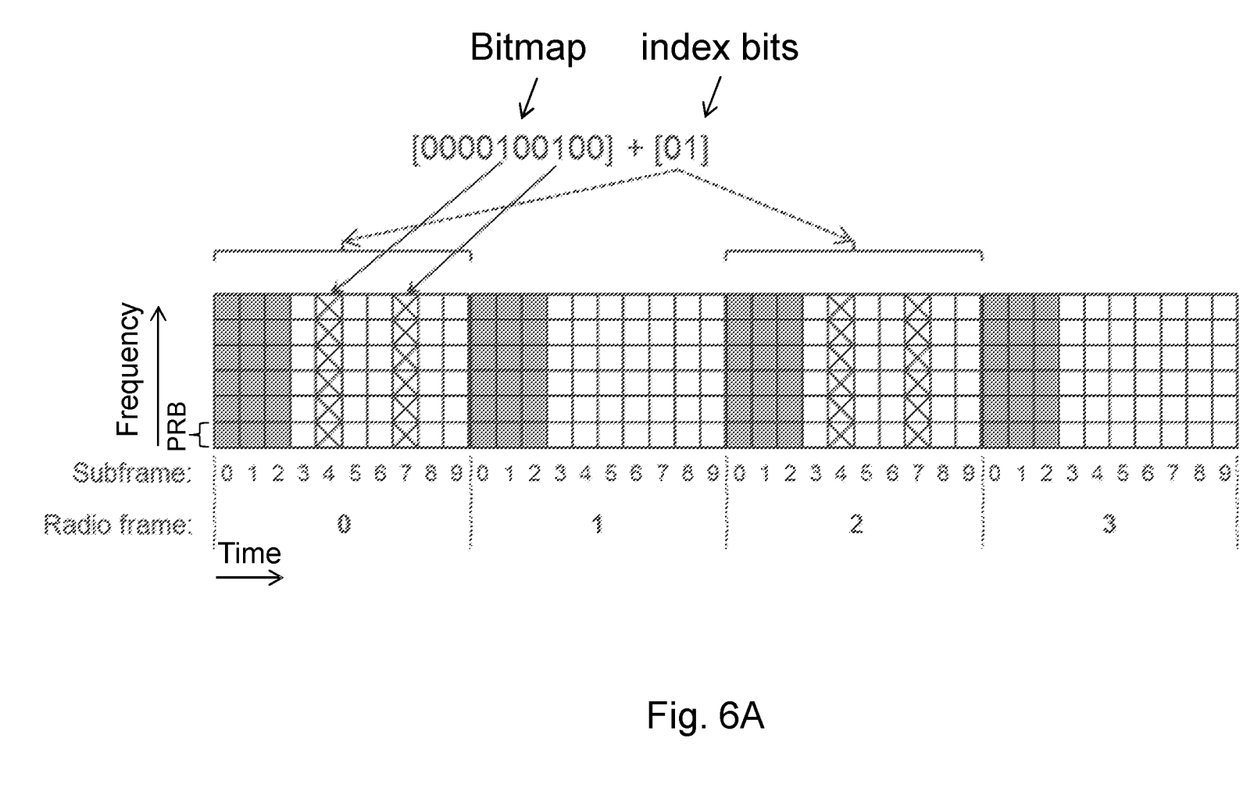
FIG. 6A schematically illustrates an exemplifying mapping of bitmap to repetition subframes.

From the signaled bits, e.g. the bitmap and the index bits, in a first SIB (SIB1), e.g. in SIB1bis, the wireless device, e.g. a Rel-13 Low Complexity/Coverage Enhanced (LC/CE) wireless device, may then determine in which subframes repetitions for the SI message will be transmitted. This is schematically illustrated in FIG. 6A. FIG. 6A schematically illustrates an exemplifying mapping of bitmap to repetition subframes. As illustrated, the SI message is repeated in the subframes having subframe numbers 4 and 7 of the radio frames having radio frame numbers 0 and 2. The subframe numbers are given by the bitmap and the radio frame numbers are given by the index bits.

It should be noted that one subframe is 1 ms long and it is on this level the scheduler works, i.e. scheduling assignments are done per subframe. Subframes are indexed from 0 to 9. One radio frame or system frame contains ten subframes and is 10 ms long. System frames are in the range from 0 to 1023 and the current System Frame Number (SFN) is indicated in the MIB.

In legacy systems, SI is not transmitted in Multicast-Broadcast Single-Frequency Network (MBSFN) subframes. It may be assumed that this principle is followed for Rel-13 MTC enhancements. In that case, in one example, the bitmap includes only subframes which are not Multimedia Broadcast Multicast Services (MBMS) subframes, i.e., in Frequency Division Duplex (FDD) these would correspond to subframes 0, 4, 5 and 9 and in Time Division Duplex (TDD) these would correspond to subframes 0, 1, 2, 5, 6. Thus the bitmap length is 4 bits (FDD) and 5 bits (TDD) per radio frame.

Some embodiments herein are generic, give the network full flexibility of scheduling transmissions in any subframes, and give no restrictions. However, it may result in that quite a few signaling bits will have to be comprised in SIB1bis; such as 11-12 bits per SI message. Therefore, in some embodiments, it may be meaningful to provide a set of pre-determined configurations for the bitmap. Further, which one of these pre-determined configuration that is used will be indicated by one or more index bits, sometimes referred to as configuration index. This is illustrated in Table 2 below, reducing the signaling load from 12 bits to only 3 bits per SI message:

TABLE 2

| Configuration index: | Bitmap configuration: |
|---|---|
| 000 | [0001000000] + [00] |
| 001 | [0001000100] + [00] |
| 010 | [0010010010] + [00] |
| 011 | [0101010010] + [00] |
| 100 | [0010010010] + [10] |
| 101 | [0010010010] + [01] |
| 110 | [0001000100] + [01] |
| 111 | [0001000000] + [11] |

In the most flexible case, a bitmap may be provided per SI message, since different SIBs have different requirement on acquisition time etc. However, this leads to a large number, e.g. the largest number, of signaling bits in SIB1bis. Therefore, other solutions may be considered such that the bitmap is common to all SI messages (makes sense since the available DL subframes not in use for MBSFN etc. are the same) and that only the radio frame index bits (e.g. [01] in FIG. 6A) are SI message specific. In the case of a 10 bits bitmap and 2 radio frame index bits, this would for 4 SI messages reduce the number of SIB1bis signaling bits from 48 (4×12) to 18 (10+4×2). A similar solution may be considered for a configuration index solution, such that parts of the configuration index bits are common and the remaining are SI message specific.

In some embodiments, alternatively or additionally, the bitmap may comprise an indication of one or more available subframes, e.g. one or more available downlink subframes, of one or more radio frame. For example, the bitmap may comprise 40 bits to cover 4 radio frames, but another suitable number of bits of the bitmap is possible.

In such embodiments, the bitmap may be accompanied by an index indicating one or more available subframes, e.g. available DL subframes, and an index, e.g. a repetition index, indicating the number of repetitions of the SI message. This is illustrated in FIG. 6B.

Figure 6B:
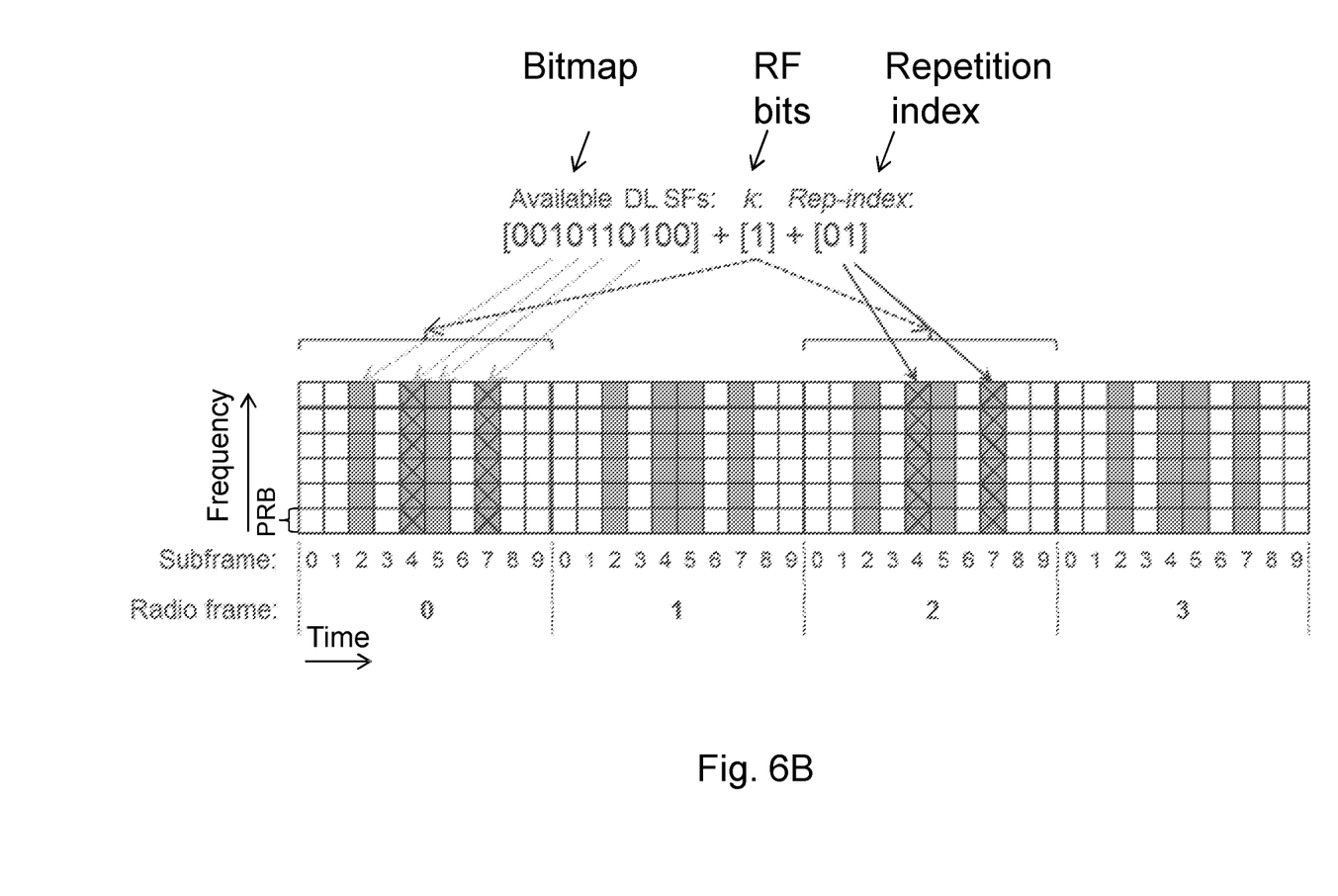
FIG. 6B schematically illustrates an exemplifying illustration of an SI message repetition indication when an available DL subframe bitmap is used.

FIG. 6B schematically illustrates an exemplifying illustration of an SI message repetition indication when an available DL subframe bitmap is used. The exemplifying illustration is for a 10 bits bitmap indicating the available downlink (DL) subframes (SFs), a 1 bit Radio Frame (RF) index, k, indicating the radio frames in which repetitions are sent, and a repetition index, Rep-Index, pointing out actual repetition. However, it should be understood that this is only given as an example and is not intended to limit embodiments disclosed herein. The repetition index, Rep-Index, in this example is given in Table 3 below:

TABLE 3

| Rep-Index, Index bits: | Available DL subframe: |
|---|---|
| 00 | 1 |
| 01 | 2 + 4 |
| 10 | 1 + 3 |
| 11 | 1, 2, 3, 4 |

If a 40 bits bitmap is used to indicate the DL subframes, the bitmap covers 4 radio frames and the radio frame index may be skipped if k is smaller or equal to 4, since longer periodicities of up to 40 ms is then already covered by the bitmap.

As previously mentioned, in some embodiments, it may be meaningful to provide a set of pre-determined configurations for the bitmap.

ABBREVIATIONS

UE User equipment
LTE Long term evolution
LC Low complexity (UE)
CE Coverage enhancement
MTC Machine type communication
E-PDCCH Enhanced physical downlink control channel
PUSCH Physical uplink shared channel
PDSCH Physical downlink shared channel
PDCCH Physical downlink control channel
ACK Acknowledgement
NACK Non-acknowledgement
PRB Physical resource block
TTI Transmission time interval
TBS Transport block size
M-PDCCH MTC physical downlink control channel
DCI Downlink control indicator NW Network
PUCCH Physical uplink control channel
eNB E-UTRAN Node B (base station)
DRX Discontinuous reception
PSM Power saving mode
MBSFN Multicast-broadcast single-frequency network
SIB System Information Block
MIB Master Information Block When using the word "comprise" or "comprising" it shall be interpreted as non-limiting, i.e. meaning "consist at least of". Further, the word "a" or "an" should be understood to refer to "at least one" or to "one or more" if not explicitly stated that it refers to a "single" entity.

The embodiments herein are not limited to the above described preferred embodiments. Various alternatives, modifications and equivalents may be used.

The invention claimed is:

1. A method performed by a Radio Network Node (RNN) for indicating scheduling of System Information (SI) messages to a wireless device are operating in a wireless communications network, the method comprising:
providing, to the wireless device in a System Information Block (SIB), a configuration index that indicates a bitmap configuration, wherein:
the bitmap configuration includes a bitmap and one or more bits representing a radio frame index, k;
the radio frame index, k, is usable to determine one or more radio frames, within which the bitmap can be applied, according to the relation: System Frame Number (SFN) modulo (k)=0; and
the bitmap is configured to indicate to the wireless device one or more subframes, within the one or more radio frames, that are available for transmission of an SI message.

2. The method of claim 1, wherein providing the bitmap configuration comprises: transmitting, to the wireless device, the bitmap configuration in an initial scheduling SIB.

3. The method of claim 1, wherein:
the configuration index indicates one of a predetermined plurality of bitmap configurations; and
each of the predetermined plurality of bitmap configurations comprises:
a radio frame index indicating one or more particular radio frames; and
a bitmap indicating a particular combination of subframes within the particular radio frames.

4. The method of claim 1, further comprising determining the bitmap configuration based on:
subframes in use for at least one of Multicast-Broadcast Single-Frequency Network (MBSFN) broadcast; unicast data transmissions; Physical Broadcast Channel (PBCH); and legacy SIB1 broadcast; and
one or more subframes available for transmission of the SI message.

5. A Radio Network Node (RNN) configured to indicate scheduling of System Information (SI) messages to a wireless device operating in a wireless communications network, the RNN comprising:
at least one processor; and
at least one memory storing computer-executable instructions that, when executed by the at least one processor, configure the RNN to:
provide, to the wireless device in a System Information Block (SIB), a configuration index that indicates a bitmap configuration, wherein:
the bitmap configuration includes a bitmap and one or more bits representing a radio frame index, k;
the radio frame index, k, is usable to determine one or more radio frames, within which the bitmap can be applied, according to the relation: System Frame Number (SFN) modulo (k)=0; and
the bitmap is configured to indicate to the wireless device one or more subframes, within the one or more radio frames, that are available for transmission of an SI message.

6. The RNN of claim 5, wherein execution of the instructions configures the RNN to provide the bitmap configuration by: transmitting the bitmap configuration to the wireless device in an initial scheduling SIB.

7. The RNN of claim 5, wherein:
the configuration index indicates one of a predetermined plurality of bitmap configurations; and
each of the predetermined plurality of bitmap configurations comprises:
a radio frame index indicating one or more particular radio frames; and
a bitmap indicating a particular combination of subframes within the particular radio frames.

8. The RNN of claim 5, wherein execution of the instructions configures the RNN to determine the bitmap configuration based on:
subframes in use for at least one of Multicast-Broadcast Single-Frequency Network (MBSFN) broadcast; unicast data transmissions; Physical Broadcast Channel (PBCH); and legacy SIB1 broadcast; and
one or more subframes available for transmission of the SI message.

9. A method performed by a wireless device for receiving an indication of scheduling of System Information (SI) messages from a Radio Network Node (RNN) in a wireless communications network, the method comprising:
obtaining, from the RNN in a System Information Block (SIB), a configuration index that indicates a bitmap configuration, wherein:
the bitmap configuration includes a bitmap and one or more bits representing a radio frame index, k;
the radio frame index, k, is usable to determine one or more radio frames, within which the bitmap can be applied, according to the relation: System Frame Number (SFN) modulo (k)=0; and
the bitmap is configured to indicate to the wireless device one or more subframes, within the one or more radio frames, that are available for transmission of an SI message.

10. The method of claim 9, wherein obtaining the bitmap configuration comprises: receiving the bitmap configuration from the RNN in an initial scheduling SIB.

11. The method of claim 9, wherein:
the configuration index indicates one of a predetermined plurality of bitmap configurations; and
each of the predetermined plurality of bitmap configurations comprises:
a radio frame index indicating one or more particular radio frames; and
a bitmap indicating a particular combination of subframes within the particular radio frames.

12. The method of claim 9, further comprising:
determining the bitmap configuration based on the configuration index; and
determining, based on the bitmap configuration, the one or more subframes, of the one or more radio frames, that comprise the SI message.

13. The method of claim 12, further comprising: reading the SI message in the determined one or more subframes of the one or more radio frames.

14. A wireless device operable for receiving an indication of scheduling of System Information (SI) messages from a Radio Network Node (RNN) in a wireless communications network, the wireless device comprising:
at least one processor; and
at least one memory storing computer-executable instructions that, when executed by the at least one processor, configure the wireless device to:
obtain, from the RNN in a System Information Block (SIB), a configuration index that indicates a bitmap configuration, wherein:
the bitmap configuration includes a bitmap and one or more bits representing a radio frame index, k;
the radio frame index, k, is usable to determine one or more radio frames, within which the bitmap can be applied, according to the relation: System Frame Number (SFN) modulo (k)=0; and
the bitmap is configured to indicate to the wireless device one or more subframes, within the one or more radio frames, that are available for transmission of an SI message.

15. The wireless device of claim 14, wherein execution of the instructions configures the wireless device to obtain the bitmap configuration by: receiving the bitmap configuration from the RNN in an initial scheduling SIB.

16. The wireless device of claim 14, wherein:
the configuration index indicates one of a predetermined plurality of bitmap configurations; and
each of the predetermined plurality of bitmap configurations comprises:
a radio frame index indicating one or more particular radio frames; and
a bitmap indicating a particular combination of subframes within the particular radio frames.

17. The wireless device of claim 14, wherein execution of the instructions further configures the wireless device to:
determine the bitmap configuration based on the configuration index; and
determine, based on the bitmap configuration, the one or more subframes, of the one or more radio frames, that comprise the SI message.

18. The wireless device of claim 17, wherein execution of the instructions further configures the wireless device to: read the SI message in the determined one or more subframes of the one or more radio frames.

19. A non-transitory, computer-readable medium storing computer-executable instructions that, when executed by at least one processor comprising a Radio Network Node (RNN), configure the RNN to perform operations corresponding to the method according to claim 1.

20. A non-transitory, computer-readable medium storing computer-executable instructions that, when executed by at least one processor comprising a wireless device, configure the wireless device to perform operations corresponding to the method according to claim 9.

* * * * *